United States Patent
Yang et al.

(10) Patent No.: US 6,989,342 B2
(45) Date of Patent: Jan. 24, 2006

(54) CATALYST FOR POLYMERIZATION AND COPOLYMERIZATION OF ETHYLENE

(75) Inventors: Chung-Byung Yang, Daejon (KR); Won-Young Kim, Daejon (KR); Ji-Yong Park, Daejon (KR); Weon Lee, Daejon (KR)

(73) Assignee: Samsung General Chemicals, Co., Ltd., Chungcheongnam (KR)

( * ) Notice: Subject to any disclaimer, the term of this patent is extended or adjusted under 35 U.S.C. 154(b) by 177 days.

(21) Appl. No.: 10/399,886

(22) PCT Filed: Jun. 20, 2002

(86) PCT No.: PCT/KR02/01177

§ 371 (c)(1),
(2), (4) Date: Apr. 22, 2003

(87) PCT Pub. No.: WO03/000746

PCT Pub. Date: Jan. 3, 2003

(65) Prior Publication Data

US 2004/0033888 A1 Feb. 19, 2004

(30) Foreign Application Priority Data

Jun. 21, 2001 (KR) ........................ 2001/35271

(51) Int. Cl.
*B01J 31/00* (2006.01)
*B01J 37/00* (2006.01)
*C08F 4/02* (2006.01)
*C08F 4/60* (2006.01)

(52) U.S. Cl. .................. 502/121; 502/119; 502/125; 502/128; 502/133; 502/134

(58) Field of Classification Search .............. 502/119, 502/121, 125, 128, 133, 134
See application file for complete search history.

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |

(Continued)

FOREIGN PATENT DOCUMENTS

| | | |
|---|---|---|
| DE | 2553104 | 6/1977 |
| EP | 0131832 | 7/1984 |
| EP | 0131832 | 1/1987 |
| EP | 0350170 | 1/1990 |
| EP | 0385765 | 9/1990 |
| EP | 0602922 | 6/1994 |
| EP | 0606125 | 7/1994 |
| EP | 0607703 | 7/1994 |
| EP | 0669347 | 8/1995 |
| GB | 1335887 | 10/1973 |
| GB | 1492618 | 1/1975 |
| JP | 51136625 | 11/1976 |
| JP | 52111528 | 9/1977 |
| JP | 59145206 | 8/1984 |
| JP | 61055103 | 3/1986 |
| JP | 61268704 | 11/1986 |
| JP | 62081405 | 4/1987 |
| JP | 63199703 | 8/1988 |
| JP | 63308003 | 12/1988 |
| JP | 06-340711 | 5/1993 |
| JP | 09176226 | 7/1997 |
| WO | WO 01/32718 | 5/2001 |

OTHER PUBLICATIONS

Wen et al. "Mechanics of Fluidization" Chemical Engineering Progress Symposium Series, 1962, vol. 62, 100–111.
Edelmann, "N–silylated benzamidines: versatile building blocks in main group and coordination chemistry," Coordination Chemistry Reviews, vol. 137, 1994, pp. 403–481.
Stokes et al., "Reactions of Cobaloxime Anions and/or Hydrides with Enynes as a New, General Route to 1,3– and 1,2–Dienylcobaloxime Complexes," Organometallics, 1996, vol. 15, pp. 2624–2632.
Zhou et al., "Synthesis and Structure of Novel Bridges Dinuclear Indium Complexes," Inorg. Chem., 1996, vol. 35, pp. 1423–1424.

(Continued)

*Primary Examiner*—Mark L. Bell
*Assistant Examiner*—J. Pasterczyk
(74) *Attorney, Agent, or Firm*—Meyertons, Hood, Kivlin, Kowert & Goetzel, P.C.; Eric B. Meyertons

(57) ABSTRACT

A solid titanium complex catalyst for polymerization and copolymerization of ethylene is prepared by the process comprising: (1) preparing a magnesium solution by reacting a halogenated magnesium compound with an alcohol; (2) reacting the magnesium solution with a phosphorus compound and a silicon compound having at least one alkoxy group to produce a magnesium composition; and (3) producing a solid titanium catalyst through recrystallization by reacting the magnesium composition solution with a mixture of a titanium compound and a haloalkane compound; and optionally reacting the solid titanium catalyst with an additional titanium compound. The solid titanium complex catalyst for polymerization and copolymerization of ethylene according to present invention exhibits high polymerization activity, and may be advantageously used in the polymerization and copolymerization of ethylene to produce polymers of high bulk density and narrow molecular weight distribution.

14 Claims, No Drawings

U.S. PATENT DOCUMENTS

| | | |
|---|---|---|
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scata et al. |
| 4,226,963 A | 10/1980 | Giannini et al. |
| 4,263,169 A | 4/1981 | Scata et al. |
| 4,277,372 A | 7/1981 | Matlack |
| 4,315,835 A | 2/1982 | Scata et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,399,054 A | 8/1983 | Ferraris et al. |
| 4,401,589 A | 8/1983 | Kioka et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |
| 4,518,706 A | 5/1985 | Gessell |
| 4,529,716 A | 7/1985 | Banzi et al. |
| 4,579,833 A | 4/1986 | Collomb et al. |
| 4,613,655 A | 9/1986 | Longi et al. |
| 4,614,727 A | 9/1986 | Longi et al. |
| 4,642,328 A | 2/1987 | Morterol et al. |
| 4,761,392 A | 8/1988 | Shiga et al. |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbe |
| 4,988,656 A | 1/1991 | Arzoumanidis et al. |
| 4,990,479 A | 2/1991 | Ishimaru et al. |
| 5,006,499 A | 4/1991 | Daire |
| 5,013,702 A | 5/1991 | Arzoumanidis et al. |
| 5,059,570 A | 10/1991 | Bailly et al. |
| 5,061,667 A | 10/1991 | Murata et al. |
| 5,064,798 A | 11/1991 | Chang |
| 5,081,090 A | 1/1992 | Arzoumanidis et al. |
| 5,104,838 A | 4/1992 | Fujita et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |
| 5,244,996 A | 9/1993 | Kawasaki et al. |
| 5,346,872 A | 9/1994 | Menon et al. |
| 5,459,116 A | 10/1995 | Ro et al. |
| 5,502,128 A | 3/1996 | Flores et al. |
| 5,585,317 A | 12/1996 | Sacchetti et al. |
| 5,587,436 A | 12/1996 | Klimek et al. |
| 5,587,440 A | 12/1996 | Ehlers et al. |
| 5,643,845 A | 7/1997 | Tajima et al. |
| 5,696,044 A | 12/1997 | Zakharov et al. |
| 5,726,261 A | 3/1998 | Sacchetti et al. |
| 5,780,378 A | 7/1998 | Toida et al. |
| 5,798,424 A | 8/1998 | Kong et al. |
| 5,817,591 A | 10/1998 | Shamshoum et al. |
| 5,844,046 A | 12/1998 | Ohgizawa et al. |
| 5,849,654 A | 12/1998 | Fushimi et al. |
| 5,849,655 A | 12/1998 | Shamshoum et al. |
| 5,869,418 A | 2/1999 | Iiskola et al. |
| 5,880,056 A | 3/1999 | Tsutsui et al. |
| 5,936,049 A | 8/1999 | Kojoh et al. |
| 5,965,478 A | 10/1999 | Goto et al. |
| 5,968,862 A | 10/1999 | Abbott et al. |
| 6,034,025 A | 3/2000 | Yang et al. |
| 6,066,702 A | 5/2000 | Ro et al. |
| 6,114,276 A | 9/2000 | Kong et al. |
| 6,214,759 B1 | 4/2001 | Chang et al. |
| 6,291,385 B1 | 9/2001 | Lee et al. |
| 6,482,764 B1 | 11/2002 | Chang et al. |
| 6,559,250 B2 | 5/2003 | Ro et al. |
| 6,762,145 B2 * | 7/2004 | Yang et al. ................. 502/103 |
| 6,803,427 B2 * | 10/2004 | Yang et al. ............. 526/123.1 |
| 2001/0031694 A1 | 10/2001 | Yang et al. |
| 2002/0037980 A1 | 3/2002 | Yang et al. |
| 2002/0045537 A1 | 4/2002 | Yang et al. |
| 2002/0120079 A1 | 8/2002 | Yang et al. |
| 2003/0032551 A1 | 2/2003 | Ro et al. |

OTHER PUBLICATIONS

Tinkler et al., "Polymerisation of ethene by the novel titanium complex [Ti(Me3SiNCH2CH2NsiMe3)CI2]; a metallocene analogue," Chem. Commun., 1996, pp. 2623–2624.

Linden et al., "Polymerization of a–Olefins and Butadiene and Catalytic Cyclotrimerization of 1–Alkynes by a New Class of Group IV Catalysts. Control of Moelcular Weight and Polymer Microstructure via Ligand Tuning in Sterically Hindered Chelating Penoxide Titanium and Zirconium Species," J. Am. Chem. Soc., 1995, vol. 117, pp. 3008–3021.

Zhou et al., "Bulky Amidinate Complexes of Tin(IV). Synthesis and Structure of Sn(RNC(R')NR)2C22 (R=Cyclohexyl, R'=H, Me; R=SiMe3, R'=tBu)," Inorg. Chem., 1997, vol. 36, pp. 501–504.

Averbuj et al. "Stereoregular Polymerization of a–Olefins Catalyzed by Chiral Group 4 Benzamidinate Complexes of C1 and C3 Symmetry" J. Am. Chem. Soc, 1998, vol. 120, 8640–8646.

* cited by examiner

CATALYST FOR POLYMERIZATION AND COPOLYMERIZATION OF ETHYLENE

BACKGROUND OF THE INVENTION

1. Field of Invention

The present invention relates to a catalyst for polymerization and copolymerization of ethylene. More particularly, the invention relates to a solid titanium complex catalyst for polymerization and copolymerization of ethylene. Embodiments of the catalyst system include a solid titanium complex catalyst supported on a carrier containing magnesium. The catalyst displays high catalytic activity whereby polymers of high bulk density and narrow molecular weight distribution may be produced.

2. Description of Related Art

The polymerization of ethylene is usually carried out in the liquid phase in the presence of a solvent such as isopentane or hexane, or in the gas phase. The important factors affecting the polymerization in these processes are: polymerization activity and hydrogen reactivity of the catalyst, bulk density of the resulting polymers, the amount of monomers soluble in the solution, particle size distribution, and the existence of fine particles in the resulting polymers. The molecular weight distribution of the resulting polymers is one of the major factors in determining the physical properties of the resulting resin. The physical properties of resin may be improved by the use of a catalyst that can produce a polymer or copolymer of ethylene having a narrow molecular weight distribution.

Recently, many methods using titanium-based catalysts containing magnesium have been reported for polymerization and copolymerization of olefins. These catalysts may provide high catalytic activity, produce polymers of high bulk density, and are known to be suitable for liquid phase and gas phase polymerization.

For example, when using a magnesium solution to obtain a catalyst which may produce olefin polymers of high bulk density, the magnesium solution is prepared by reacting magnesium compounds with an electron donor. Electron donors include alcohols, amines, cyclic ethers, or organic carboxylic acids. The magnesium solution is prepared in the presence of a hydrocarbon solvent. A magnesium supported catalyst may be prepared by reacting the magnesium solution with halogen compounds such as titanium tetrachloride. Methods using an alcohol to prepare a magnesium solution are disclosed in U.S. Pat. Nos. 3,642,746, 4,336,360, 4,330,649, and 5,106,807. Also, U.S. Pat. Nos. 4,477,639 and 4,518,706 disclose a method which uses tetrahydrofuran or a cyclic ester as the solvent for dissolving the magnesium compound. Although these catalysts may produce polymers of high bulk density, the catalysts need to be improved regarding catalytic activity of the catalyst and molecular weight distribution of the resulting polymers.

In addition, U.S. Pat. Nos. 4,847,227, 4,816,433, 4,829,037, 4,970,186, and 5,130,284 have reported the preparation of olefin polymerization catalysts which have good polymerization activity and can enhance the bulk density of resulting polymers. Increased polymerization activity was achieved by reacting electron donors such as magnesium, alkoxide, dialkylphthalate or phthaloyl chloride with a titanium chloride compound. U.S. Pat. No. 5,459,116 has reported a method for preparing a titanium solid catalyst by contacting a magnesium solution containing an ester having at least one hydroxyl group as an electron donor with a titanium compound. By this method, it is possible to obtain a catalyst which has high polymerization activity and affords high bulk density in resulting polymers, but there is much to be improved regarding molecular weight distribution of the resulting polymers.

Therefore, there is a demand for catalysts for polymerization and copolymerization of ethylene which may be prepared by a simple process, have high polymerization activity and controlled particle size, and which can produce polymers having narrow molecular weight distribution.

SUMMARY

The object of the present invention is to solve the problems of prior art methods as mentioned above, and to provide a catalyst for polymerization and copolymerization of ethylene. More particularly, the object is to provide a catalyst which has high catalytic activity as required in the polymerization and copolymerization of ethylene, controlled catalyst particle size to afford high bulk density to the resulting polymer, and, especially, which can produce polymers having narrow molecular weight distribution.

DETAILED DESCRIPTION OF THE PREFERRED EMBODIMENTS

In an embodiment, a catalyst for the polymerization and copolymerization of ethylene, which has high catalytic activity and may produce polymers of high bulk density and narrow molecular weight distribution, may be prepared by the process including:

(1) preparing a magnesium solution by contacting halogenated magnesium compound with an alcohol;

(2) reacting the magnesium solution with a phosphorus compound and a silicon compound having at least one alkoxy group to produce a magnesium composition solution; and (3) producing a solid titanium catalyst by reacting the magnesium composition solution with a mixture of a titanium compound and a haloalkane compound.

The process for preparing a catalyst for polymerization and copolymerization of ethylene can optionally further include:

(4) producing a titanium catalyst by reacting the solid titanium catalyst with an additional titanium compound.

The process for preparing the catalyst for polymerization and copolymerization of ethylene will be described below in more detail.

A magnesium solution is prepared by contacting a magnesium compound with an alcohol. In one embodiment, the magnesium compound may be a halogenated magnesium compound. Types of halogenated magnesium compounds used in the present invention may include the following: dihalogenated magnesium compounds such as magnesium chloride, magnesium iodide, magnesium fluoride, and magnesium bromide; alkylmagnesium halide compounds such as methylmagnesium halide, ethylmagnesium halide, propylmagnesium halide, butylmagnesium halide, isobutylmagnesium halide, hexylmagnesium halide, and amylmagnesium halide; alkoxymagnesium halide compounds such as methoxymagnesium halide, ethoxymagnesium halide, isopropoxymagnesium halide, butoxymagnesium halide and octoxymagnesium halide; and aryloxymagnesium halides such as phenoxymagnesium halide and methylphenoxymagnesium halide. These magnesium compounds may be used as a single compound or as a mixture of two or more compounds. Further, the above magnesium compounds may effectively be used in the form of a complex compound with other metals.

Other magnesium compounds include compounds that cannot be represented by a formula, as may occur depending on the production method of magnesium compounds. Such compounds may generally be regarded as a mixture of magnesium compounds. For example, the following compounds may be used as a magnesium compound: such compounds obtained by reacting magnesium compound with a polysiloxane compound, a silane compound containing halogen, an ester, or an alcohol; and such compounds obtained by reacting magnesium metal with an alcohol, a phenol or an ether in the presence of a halosilane, phosphorus pentachloride, or thionyl chloride.

In some embodiments, the magnesium compounds may be magnesium halides, especially magnesium chloride; alkylmagnesium chloride, having an alkyl group with 1~10 carbon atoms; alkoxymagnesium chlorides, having an alkoxy group with 1~10 carbon atoms; or aryloxymagnesium chlorides, having an aryloxy group with 6~20 carbon atoms.

The magnesium solution used may be prepared as a solution by dissolving the magnesium compound into an alcohol in the presence or in the absence of a hydrocarbon solvent. The types of hydrocarbon solvents used in the present invention may be aliphatic hydrocarbons such as pentane, hexane, heptane, octane, decane, and kerosene; alicyclic hydrocarbons such as cyclobenzene, methylcyclobenzene, cyclohexane, and methylcyclohexane; aromatic hydrocarbons such as benzene, toluene, xylene, ethylbenzene, cumene, and cymene; and halogenated hydrocarbons such as dichloropropane, dichloroethylene, trichloromethylene, carbon tetrachloride, and chlorobenzene.

The preparation of a magnesium solution from a magnesium compound may be carried out using an alcohol as a solvent in the presence or in the absence of a hydrocarbon solvent such as mentioned above. The types of alcohol may include alcohols containing 1~20 carbon atoms, such as methanol, ethanol, propanol, butanol, pentanol, hexanol, octanol, decanol, dodecanol, octadecyl alcohol, benzyl alcohol, phenylethyl alcohol, isopropyl benzyl alcohol, and cumyl alcohol, and the preferable alcohol may be chosen from alcohols containing 1~12 carbon atoms.

The average size and particle size distribution of the obtained catalysts may depend on the type and amount of alcohol used, the type of magnesium compound, and the ratio of magnesium compound to alcohol. The quantity of alcohol used to obtain the magnesium solution is at least 0.5 mol, or may be about 1.0~20 mol, or more particularly about 2.0~10 mol per one mole of magnesium compounds.

During the preparation of a magnesium solution, the reaction of a magnesium compound and an alcohol may be carried out in the presence of a hydrocarbon. The reaction temperature may vary depending on the type and amount of alcohol used, and may be at least about −25° C., preferably about −10~200° C., or more preferably about 0~150° C. The reaction time may be about 15 minutes to 5 hours, or preferably about 30 minutes to 4 hours.

The magnesium solution prepared in step (1) may be reacted with a phosphorus compound as an electron donor, and a silicon compound having at least one alkoxy group to form a magnesium composition solution.

Among the electron donors, the phosphorus compound used is preferably the one represented by the following general formula:

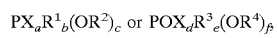

$PX_aR^1_b(OR^2)_c$ or $POX_dR^3_e(OR^4)_f$ where X is a halogen atom, and $R^1, R^2, R^3$ and $R^4$ are hydrocarbons such as alkyl, alkenyl or aryl having 1~20 carbon atoms, each of which may be the same or different from one another, and a, b, c, d, e and f are integers between 0 and 3 satisfying a+b+c=3 and d+e+f=3. Specific examples include phosphorus trichloride, phosphorus tribromide, diethylchlorophosphite, diphenylchlorophosphite, diethylbromophosphite, diphenylbromophosphite, dimethylchlorophosphite, phenylchlorophosphite, trimethylphosphite, triethylphosphite, tri-n-butylphosphite, trioctylphosphite, tridecylphosphite, triphenylphosphite, triethylphosphate, tri-n-butylphosphate, and triphenylphosphate. Other phosphorus compounds satisfying the aforementioned formula may also be used.

As for the amount used, 0.25 mole or below per 1 mole of magnesium compound, and more preferably 0.2 mole or below per 1 mole of magnesium compound, is appropriate.

As a silicon compound having at least one alkoxy group, which is used as another electron donor in step (2), the compound represented by the general formula of $R^1_aR^2_bR^3_cR^4_dSi(OR^5)_e$ (wherein each $R^1, R^2, R^3, R^4$, and $R^5$ is a hydrocarbon having 1~12 carbon atoms, each of which may be the same or different from each other, and a, b, c, d, and e are integers between 0 and 4 satisfying the formula a+b+c+d+e=4) may be used in some embodiments. For example, the following compounds may be used: dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate or methyltriaryloxysilane.

The amount of these compound may be about 0.05~3 mol, or preferably about 0.1~2 mol per one mole of magnesium.

The appropriate temperature for the reaction of the magnesium solution, the phosphorus compound and the alkoxy silicon compound is about 0~100° C., or more preferably about 10~70° C.

Catalyst particles may be recrystallized by treating the magnesium solution prepared in step (2) with a liquid mixture of a titanium compound represented by the general formula of $Ti(OR)_aX_{4-a}$ (wherein R is a alkyl group having 1~10 carbon atoms, X is a halogen atom, and "a" is an integer between 0 and 4) and a haloalkane. Examples of titanium compounds which satisfy the above general formula are: tetrahalogenated titanium such as $TiCl_4$, $TiBr_4$, and $TiI_4$; trihalogenated alkoxytitanium such as $Ti(OCH_3)Cl_3$, $Ti(OC_2H_5)Cl_3$, $Ti(OC_2H_5)Br_3$, and $Ti(O(i-C_4H_9))Br_3$; dihalogenated alkoxytitanium such as $Ti(OCH_3)_2Cl_2$, $Ti(OC_2H_5)_2Cl_2$, $Ti(O(i-C_4H_9))_2Cl_2$ and $Ti(OC_2H_5)_2Br_2$; and tetraalkoxytitanium such as $Ti(OCH_3)_4$, $Ti(OC_2H_5)_4$, and $Ti(OC_4H_9)_4$. A mixture of the above titanium compounds may also be used. The preferable titanium compounds are those containing halogen, or more preferably titanium tetrachloride.

The haloalkane compound may be a hydrocarbon compound having 1~20 carbon atoms, and this compound may be used alone or as a mixture of two or more of the above compounds.

Examples of haloalkene compounds include: monochloromethane, dichloromethane, trichloromethane, tetrachloromethane, monochloroethane, 1,2-dichloroethane, monochloropropane, monochlorobutane, monochloro-sec-butane, monochloro-tert-butane, monochlorocyclohexane, chlorobenzene, monobromomethane, monobromopropane, monobromobutane and monoiodomethane. The preferable haloalkane compound is chloroalkane compound.

The appropriate amount of the mixture of a titanium compound and a silicon compound used in recrystallization of a magnesium solution is about 0.1~200 mol, or preferably about 0.1~100 mol, or more preferably about 0.2~80 mol per one mole of magnesium compound. The mixing molar ratio of the titanium compound to the silicon compound is approximately 1:0.05~0.95, or more preferably about 1:0.1~0.8.

When the magnesium compound solution is reacted with the mixture of a titanium compound and a silicon compound, the shape and the size of the recrystallized solid matter components greatly depend on the reaction conditions. So, in order to control the shape of the particles, it may be preferable to produce a solid matter composition by reacting the magnesium compound solution with a mixture of a titanium compound and a silicon compound at a sufficiently low temperature. The reaction temperature may be about −70~70° C., or more preferably about −50~50° C. After the contact-reaction, the reacting temperature is slowly raised so that sufficient reaction is carried out for the duration of about 0.5~5 hours at about 50~150° C.

The particles of solid catalyst obtained by the above description may be further reacted with an additional titanium compound. The titanium compound used may be titanium halide or halogenated alkoxy titanium with an alkoxy functional group having 1~20 carbon atoms. When appropriate, a mixture of these compounds may also be used. Among these compounds, titanium halide or halogenated alkoxytitanium with alkoxy functional group having 1~8 carbon atoms is appropriate, and the more preferable compound is titanium tetrahalide.

The catalyst prepared according to the process described herein may be used for polymerization and copolymerization of ethylene. In particular, the catalyst can be advantageously used in homo-polymerization of ethylene, and also in copolymerization of ethylene alpha-olefins having three or more carbon atoms, such as propylene, 1-butene, 1-pentene, 4-methyl-1-pentene, or 1-hexene.

The polymerization reaction using the catalyst described herein may be carried out by using a catalyst system, which includes: (I) a solid titanium complex catalyst described herein including magnesium, titanium, halogen, and an electron donor; and (II) organometallic compounds including metals in Groups II or III of the Periodic Table.

The organometallic compound (II) may be represented by the general formula of $MR_n$, wherein M is a metal component in Group II or IIIA of the Periodic Table, such as magnesium, calcium, zinc, boron, aluminum, or gallium, R is an alkyl group having 1~20 carbon atoms, such as a methyl, ethyl, butyl, hexyl, octyl, or decyl, and n is the atomic valence of the above metal component. In some embodiments, the organometallic compound is trialkylaluminum having an alkyl group of 1~6 carbon atoms, such as triethylaluminum and triisobutylaluminum, or mixtures thereof. When appropriate, an organoaluminum compound having one or more of halogens or hydride groups, such as ethylaluminum dichloride, diethylaluminum chloride, ethylaluminum sesquichloride, or diisobutylaluminum hydride may also be used.

The solid titanium complex catalyst component described herein may be pre-polymerized with ethylene or alpha-olefin before using in the polymerization reaction. The pre-polymerization may be carried out in the presence of a hydrocarbon solvent such as hexane, at a sufficiently low temperature, under the pressure of ethylene or alpha-olefin, and in the presence of the above catalyst component and an organoaluminum compound such as triethylaluminum.

Maintaining the shape of the catalyst by surrounding the catalyst particle with polymers is useful in enhancing the shapes of polymers after polymerization. The weight ratio of polymer to catalyst after pre-polymerization is usually about 0.1:1~20:1.

The polymerization reaction may be carried out by gas phase polymerization or bulk polymerization in the absence of an organic solvent, or by liquid slurry polymerization in the presence of an organic solvent. These polymerization methods, however, may be carried out in the absence of oxygen, water, and other compounds that may act as catalytic poison.

In some embodiments, the concentration of the solid titanium complex catalyst (I) in the polymerization reaction system, for liquid-phase slurry polymerization, is about 0.001~5 mmol of titanium atom, or more preferably about 0.001~0.5 mmol of titanium atom, per one liter of solvent. As a solvent, the following compounds or their mixtures may be used: alkanes such as pentane, hexane, heptane, n-octane, isooctane, cyclohexane and methylcyclohexane; alkylaromatic compounds such as toluene, xylene, ethylbenzene, isopropylbenzene, ethyltoluene, n-propylbenzene and diethylbenzene; and halogenated aromatic compounds such as chlorobenzene, chloronaphthalene and ortho-dichlorobenzene.

In the case of gas phase polymerization, the quantity of the solid titanium complex catalyst (I) is about 0.001~5 mmol of titanium atom, preferably about 0.001~1.0 mmol of titanium atom, or more preferably about 0.01~0.5 mmol of titanium atom, per one liter of the polymerization reactant. The preferable concentration of the organometallic compound (II) is about 1~2,000 mol of aluminum atom, or more preferably about 5~500 mol of aluminum atom, per one mole of titanium atoms in catalyst (I).

To ensure a high reaction velocity of polymerization, the polymerization reaction may be carried out at a sufficiently high temperature, regardless of the polymerization process. Generally, an appropriate temperature is about 20~200° C., or more preferably about 20~95° C. The appropriate pressure of monomers during polymerization is 1~100 atm, or more preferably about 2~50 atm.

EXAMPLES

The following examples are included to demonstrate certain embodiments. It should be appreciated by those of skill in the art that the techniques disclosed in the examples which follow represent techniques discovered which function well in the practice of the disclosure herein. However, those of skill in the art should, in light of the present disclosure, appreciate that many changes can be made in the specific embodiments which are disclosed and still obtain a like or similar result without departing from the spirit and scope of the invention.

Example 1

Preparation of a Solid Titanium Complex Catalyst

A solid titanium complex catalyst component was prepared in the following manner.

(i): Preparation of a magnesium solution 19.0 g of $MgCl_2$ and 400 ml of decane were introduced into a reactor of 1.0 l which was equipped with a mechanical stirrer and was purged with nitrogen atmosphere. After stirring at 700 rpm, 120 ml of 2-ethyl hexanol was added and the reaction was carried out for three hours at the temperature of 110° C. The homogenous solution obtained by the reaction was cooled to room temperature (25° C.).

(ii): Contacting the magnesium solution with phosphorus compound and alkoxy silicon compound To the magnesium compound solution prepared in (i), which is cooled to 25° C., 5.1 ml of triethylphosphate and 12.0 ml of silicon tetraethoxide were added, and the reaction was carried out for an hour.

(iii) and (iv): Treatment with a mixture of titanium compound and haloalkane compound, and treatment with titanium compound After setting the temperature of the solution prepared in step (ii) to 15° C., a solution of a mixture of 40 ml of titanium tetrachloride and 40 ml of tetrachloromethane were dripped thereto for an hour. After completing the dripping process, the temperature of the reactor was raised to 70° C. for an hour and maintained at that temperature for an hour. After stirring, the supernatant liquid of the solution was removed, and 300 ml of decane and 100 ml of titanium tetrachloride were added to the remaining solid, consecutively. Then, the temperature was raised to 90° C. and maintained for two hours. Then the reactor was cooled to room temperature and was washed with 400 ml of hexane until free titanium tetrachloride remaining unreacted was completely removed. The titanium content of the prepared solid catalyst was 3.7%.

Polymerization

A 2 liter high pressure reactor was assembled while hot after drying in an oven. By purging the reactor with nitrogen and evacuating the reactor alternatively three times, the reactor was set to nitrogen atmosphere. Then, 1,000 ml of n-hexane was introduced, and after introducing 1 mmol of triethylalumininum and solid titanium complex catalyst of 0.03 mmol titanium atom, 1,000 ml of hydrogen was added. The temperature of the reactor was raised to 80° C. while stirring at 700 rpm with a stirrer and the pressure of ethylene was set to 80 psi, and the polymerization was carried out for an hour. After the polymerization, the temperature of the reactor was lowered to room temperature, and excess amount of ethanol solution was added to the polymerized substance. The polymers produced were separated and collected, and dried in a vacuum oven at 50° C. for at least six hours to afford polyethylene in the form of white powder.

Evaluation

The polymerization activity of the catalyst was calculated as the weight ratio of the polymers produced (kg) to catalysts used (g), and the bulk density (g/ml) of the produced polymers was measured, and the results are shown in Table 1.

Also, to evaluate the hydrogen reactivity by evaluating the molecular weight of the polymer, melt index (g/10 min) was measured by the method prescribed in ASTM D 1238, and the molecular weight distribution of the polymers was measured by general gel permeation chromatography (GPC) method, and the results are shown in Table 1. In general, melt index increases as the molecular weight is reduced.

Example 2

A catalyst was prepared in the same way as in example 1 except that the treatment of the mixture of titanium compound and haloalkane compound in step (iii) was carried out by using a solution of a mixture of 40 ml of titanium tetrachloride and 40 ml of trichloromethane. The titanium content of the prepared catalyst was 3.7%. Polymerization was carried out by using this catalyst in the same way as in example 1, and the results are shown in Table 1.

Example 3

A catalyst was prepared in the same way as in example 1 except that the treatment of the mixture of titanium compound and haloalkane compound in step (iii) was carried out by using a solution of a mixture of 40 ml of titanium tetrachloride and 40 ml of tert-butylchloride. The titanium content of the prepared catalyst was 3.6%. Polymerization was carried out by using this catalyst in the same way as in example 1, and the results are shown in Table 1.

Example 4

A catalyst was prepared in the same way as in example 1 except that the treatment of the mixture of titanium compound and haloalkane compound in step (iii) was carried out by using a solution of a mixture of 40 ml of titanium tetrachloride and 40 ml of 1,2-dichloroethane. The titanium content of the prepared catalyst was 3.9%. Polymerization was carried out by using this catalyst in the same way as in example 1, and the results are shown in Table 1.

Example 5

A catalyst was prepared in the same way as in example 1 except that the treatment of the mixture of titanium compound and haloalkane compound in step (iii) was carried out by using a solution of a mixture of 40 ml of titanium tetrachloride and 40 ml of chlorobenzene. The titanium content of the prepared catalyst was 4.3%. Polymerization was carried out by using this catalyst in the same way as in example 1, and the results are shown in Table 1.

Example 6

A catalyst was prepared in the same way as in example 1 except that the treatment of the mixture of titanium compound and haloalkane compound in step (iii) was carried out by using a solution of a mixture of 60 ml of titanium tetrachloride and 60 ml of tetrachloromethane. The titanium content of the prepared catalyst was 4.3%. Polymerization was carried out by using this catalyst in the same way as in example 1, and the results are shown in Table 1.

Example 7

A catalyst was prepared in the same way as in example 1 except that the treatment of the mixture of titanium compound and haloalkane compound in step (iii) was carried out by using a solution of a mixture of 80 ml of titanium tetrachloride and 80 ml of tetrachloromethane. The titanium content of the prepared catalyst was 4.2%. Polymerization was carried out by using this catalyst in the same way as in example 1, and the results are shown in Table 1.

Example 8

A catalyst was prepared in the same way as in example 1 except that the treatment of the mixture of titanium compound and haloalkane compound in step (iii) was carried out by using a solution of a mixture of 60 ml of titanium tetrachloride and 30 ml of tetrachloromethane. The titanium content of the prepared catalyst was 4.2%. Polymerization was carried out by using this catalyst in the same way as in example 1, and the results are shown in Table 1.

Example 9

A catalyst was prepared in the same way as in example 1 except that the treatment of the mixture of titanium compound and haloalkane compound in step (iii) was carried out by using a solution of a mixture of 40 ml of titanium tetrachloride and 80 ml of tetrachloromethane. The titanium content of the prepared catalyst was 3.5%. Polymerization

Example 10

A catalyst was prepared in the same way as in example 1 except that the treatment of the mixture of titanium compound and haloalkane compound in step (iii) was carried out by using a solution of a mixture of 60 ml of titanium tetrachloride and 30 ml of trichloromethane. The titanium content of the prepared catalyst was 4.2%. Polymerization was carried out by using this catalyst in the same way as in example 1, and the results are shown in Table 1.

Example 11

A catalyst was prepared in the same way as in example 1 except that the treatment of the mixture of titanium compound and haloalkane compound in step (iii) was carried out by using a solution of a mixture of 40 ml of titanium tetrachloride and 80 ml of trichloromethane. The titanium content of the prepared catalyst was 3.7%. Polymerization was carried out by using this catalyst in the same way as in example 1, and the results are shown in Table 1.

Example 12

A catalyst was prepared in the same way as in example 1 except that the treatment of the mixture of titanium compound and haloalkane compound in step (iii) was carried out by using a solution of a mixture of 60 ml of titanium tetrachloride and 30 ml of chlorobenzene. The titanium content of the prepared catalyst was 4.4%. Polymerization was carried out by using this catalyst in the same way as in example 1, and the results are shown in Table 1.

Example 13

A catalyst was prepared in the same way as in example 1 except that 5.4 ml of tributylphosphate and 12.0 ml of silicon tetraethoxide are used in step (ii). The titanium content of the prepared catalyst was 4.3%. Polymerization was carried out by using this catalyst in the same way as in example 1, and the results are shown in Table 1.

Example 14

A catalyst was prepared in the same way as in example 1 except that 8.1 ml of tributylphosphite and 12.0 ml of silicon tetraethoxide are used in step (ii). The titanium content of the prepared catalyst was 4.3%. Polymerization was carried out by using this catalyst in the same way as in example 1, and the results are shown in Table 1.

Example 15

A catalyst was prepared in the same way as in example 1 except that 4.3 ml of diethylchlorophosphite and 12.0 ml of silicon tetraethoxide are used in step (ii). The titanium content of the prepared catalyst was 3.8%. Polymerization was carried out by using this catalyst in the same way as in example 1, and the results are shown in Table 1.

Example 16

A catalyst was prepared in the same way as in example 1 except that 2.6 ml of phosphorus trichloride and 12.0 ml of silicon tetraethoxide are used in step (ii). The titanium content of the prepared catalyst was 4.5%. Polymerization was carried out by using this catalyst in the same way as in example 1, and the results are shown in Table 1.

Comparative Example 1

A catalyst was prepared in the same way as in example 1 except that in step (ii), 12.0 ml of silicon tetraethoxide was used and triethylphosphate was not used. The titanium content of the prepared catalyst was 4.0%. Polymerization was carried out by using this catalyst in the same way as in example 1, and the results are shown in Table 1.

Comparative Example 2

A catalyst was prepared in the same way as in example 1 except that in step (ii), 5.1 ml of triethylphosphate was used and silicon tetraethoxide was not used. The titanium content of the prepared catalyst was 4.3%. Polymerization was carried out by using this catalyst in the same way as in example 1, and the results are shown in Table 1.

Comparative Example 3

A catalyst was prepared in the same way as in example 1 except that in step (ii), triethylphophate and silicon tetraethoxide were not used. The titanium content of the prepared catalyst was 4.5%. Polymerization was carried out by using this catalyst in the same way as in example 1, and the results are shown in Table 1.

Comparative Example 4

A catalyst was prepared in the same way as in example 1 except that in step (iii), 40 ml of titanium tetrachloride was used instead of a mixture of titanium tetrachloride and tetrachloromethane. The titanium content of the prepared catalyst was 4.2%. Polymerization was carried out by using this catalyst in the same way as in example 1, and the results are shown in Table 1.

Comparative Example 5

A catalyst was prepared in the same way as in example 1 except that in step (iii), 40 ml of silicon tetrachloride was used instead of a mixture of titanium tetrachloride and tetrachloromethane. The titanium content of the prepared catalyst was 3.7%. Polymerization was carried out by using this catalyst in the same way as in example 1, and the results are shown in Table 1.

Comparative Example 6

A catalyst was prepared in the same way as in example 1 except that in step (iii), 30 ml of triethylaluminum was used instead of a mixture of titanium tetrachloride and tetrachloromethane. The titanium content of the prepared catalyst was 4.3%. Polymerization was carried out by using this catalyst in the same way as in example 1, and the results are shown in Table 1.

TABLE 1

| | Activity (kg of PE/g of catalyst) | Bulk Density (g/ml) | MI (g/10 min) | Molecular weight distribution (Mw/Mn) |
| --- | --- | --- | --- | --- |
| E1 | 2.3 | 0.36 | 31.9 | 5.6 |
| E2 | 2.4 | 0.38 | 28.2 | 5.4 |
| E3 | 2.5 | 0.37 | 28.4 | 6.0 |
| E4 | 2.4 | 0.37 | 29.2 | 6.1 |
| E5 | 2.7 | 0.36 | 31.1 | 6.2 |
| E6 | 2.5 | 0.38 | 32.1 | 5.8 |
| E7 | 2.7 | 0.38 | 27.1 | 6.3 |
| E8 | 2.5 | 0.37 | 31.8 | 6.2 |

TABLE 1-continued

| | Activity (kg of PE/g of catalyst) | Bulk Density (g/ml) | MI (g/10 min) | Molecular weight distribution (Mw/Mn) |
|---|---|---|---|---|
| E9 | 2.8 | 0.37 | 29.8 | 6.2 |
| E10 | 2.6 | 0.39 | 30.8 | 6.1 |
| E11 | 2.3 | 0.38 | 32.4 | 5.7 |
| E12 | 2.4 | 0.37 | 31.7 | 5.8 |
| E13 | 2.3 | 0.36 | 28.8 | 6.0 |
| E14 | 2.6 | 0.36 | 30.9 | 6.4 |
| E15 | 2.4 | 0.37 | 29.8 | 6.3 |
| E16 | 2.7 | 0.38 | 28.7 | 5.9 |
| CE1 | 1.8 | 0.32 | 19.4 | 6.7 |
| CE2 | 2.0 | 0.32 | 17.5 | 7.2 |
| CE3 | 1.9 | 0.28 | 9.4 | 8.6 |
| CE4 | 2.0 | 0.31 | 18.1 | 7.5 |
| CE5 | 2.1 | 0.29 | 12.8 | 7.6 |
| CE6 | 2.2 | 0.28 | 6.7 | 8.5 |

*E: Example, CE: Comparative Example

As can be seen in Table 1, the catalyst for polymerization and copolymerization of ethylene described herein exhibits catalytic activity higher than that of comparative examples by 20~30%. In addition, the polymers produced by the catalyst described herein have higher bulk density and melt index, and narrower molecular weight distribution than those of comparative examples.

INDUSTRIAL APPLICABILITY

As described in the specification, by using the catalyst in the polymerization of ethylene and in the copolymerization of ethylene and other alpha-olefin, polymers may be produced with high yield rate due to the high activity of the catalyst, and there may be no need of removing catalyst residue. The polymers produced by using the catalyst may show excellent physical properties such as high bulk density and fluidity, and narrow molecular weight distribution. In conclusion, the solid titanium complex catalyst described herein is very useful as a catalyst for polymerization and copolymerization of ethylene.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the precisely preferred embodiments. Elements and materials may be substituted for those illustrated and described herein, parts and processes may be reversed, and certain features of the invention may be utilized respectively, all as would be apparent to one skilled in the art after having the benefit of this description of the invention. Changes may be made in the elements described herein without departing from the spirit and scope of the invention as described in the following claims.

What is claimed is:

1. A catalyst for polymerization and copolymerization of ethylene, prepared by a method comprising:
  (1) preparing a magnesium solution by reacting a halogenated magnesium compound with an alcohol;
  (2) reacting the magnesium solution with a phosphorus compound and a silicon compound having at least one alkoxy group to produce a magnesium composition solution; and
  (3) producing a solid titanium catalyst by reacting the magnesium composition solution with a mixture of a titanium compound and a haloalkane compound.

2. The catalyst of claim 1, wherein the method further comprises reacting the solid titanium catalyst with an additional titanium compound.

3. The catalyst of claim 1, wherein the phosphorus compound is represented by the following general formula:

$$PX_aR^1_b(OR^2)_c \text{ or } POX_dR^3_e(OR^4)_f$$

where X is a halogen atom, and $R^1, R^2, R^3$ and $R^4$ are hydrocarbyls having 1~20 carbon atoms, each of which is the same or different from one another, and a, b, c, d, e and f are integers between 0 and 3 satisfying $a+b+c=3$ and $d+e+f=3$.

4. The catalyst of claim 1, wherein the silicon compound having an alkoxy group is a compound represented by the general formula of $R^1_aR^2_bR^3_c\text{Si}(OR^5)_e$, and wherein each of $R^1, R^2, R^3$ and $R^5$ independently are a hydrocarbyl group having about 1~12 carbon atoms, and wherein a, b, and c are integers between 0 and 4, e is an integer between 1 and 4 and wherein a, b, c, and e satisfy the equation $a+b+c+d+e=4$.

5. The catalyst of claim 1, wherein the titanium compound is represented by the general formula of $Ti(OR)_aX_{4-a}$, and wherein R is an alkyl group having 1~10 carbon atoms, X is a halogen atom, and a is an integer between 0 and 4.

6. The catalyst of claim 1, wherein the haloalkane compound is a hydrocarbon compound which contains at least one halogen and has 1~20 carbon atoms.

7. The catalyst of claim 1, wherein the amount of the mixture of titanium compound and haloalkane compound is about 0.1~200 mol of total titanium compound plus haloalkane per one mole of magnesium compound, and wherein the mixing molar ratio of the haloalkane compound to the titanium compound is about 0.05~0.95.

8. A method of preparing a catalyst for polymerization and copolymerization of ethylene, comprising:
  (1) preparing a magnesium solution by reacting a halogenated magnesium compound with an alcohol;
  (2) reacting the magnesium solution with a phosphorus compound and a silicon compound having at least one alkoxy group to produce a magnesium composition solution; and
  (3) producing a solid titanium catalyst by reacting the magnesium composition solution with a mixture of a titanium compound and a haloalkane compound.

9. The method of claim 8, wherein the method further comprises reacting the solid titanium catalyst with an additional titanium compound.

10. The method of claim 8, wherein the phosphorus compound is the one represented by the following general formula:

$$PX_aR^1_b(OR^2)_c \text{ or } POX_dR^3_e(OR^4)_f$$

where X is a halogen atom, and $R^1, R^2, R^3$ and $R^4$ are hydrocarbyls having 1~20 carbon atoms, each of which is the same or different from one another, and a, b, c, d, e and f are integers between 0 and 3 satisfying $a+b+c=3$ and $d+e+f=3$.

11. The method of claim 8, wherein the silicon compound having an alkoxy group is a compound represented by the general formula of $R^1_aR^2_bR^3_c\text{Si}(OR^5)_e$ and wherein each of $R^1, R^2, R^3$ and $R^5$ independently are a hydrocarbyl group having about 1~12 carbon atoms, and wherein a, b, c, d, and e are integers between 0 and 4, e is an integer between 1 and 4 and wherein a, b, and c, satisfy the equation $a+b+c+e=4$.

12. The method of claim 8, wherein the titanium compound is represented by the general formula of $Ti(OR)_aX_{4-a}$, and wherein R is an alkyl group having 1~10 carbon atoms, X is a halogen atom, and a is an integer between 0 and 4.

13. The method of claim 8, wherein the haloalkane compound is a hydrocarbon compound which contains at least one halogen and has 1~20 carbon atoms.

14. The method of claim 8, wherein the amount of the mixture of titanium compound and haloalkane compound is about 0.1~200 mol of total titanium compound plus haloalkane per one mole of magnesium compound, and wherein the mixing molar ratio of the haloalkane compound to the titanium compound is about 0.05~0.95.

* * * * *